United States Patent Office 2,732,310
Patented Jan. 24, 1956

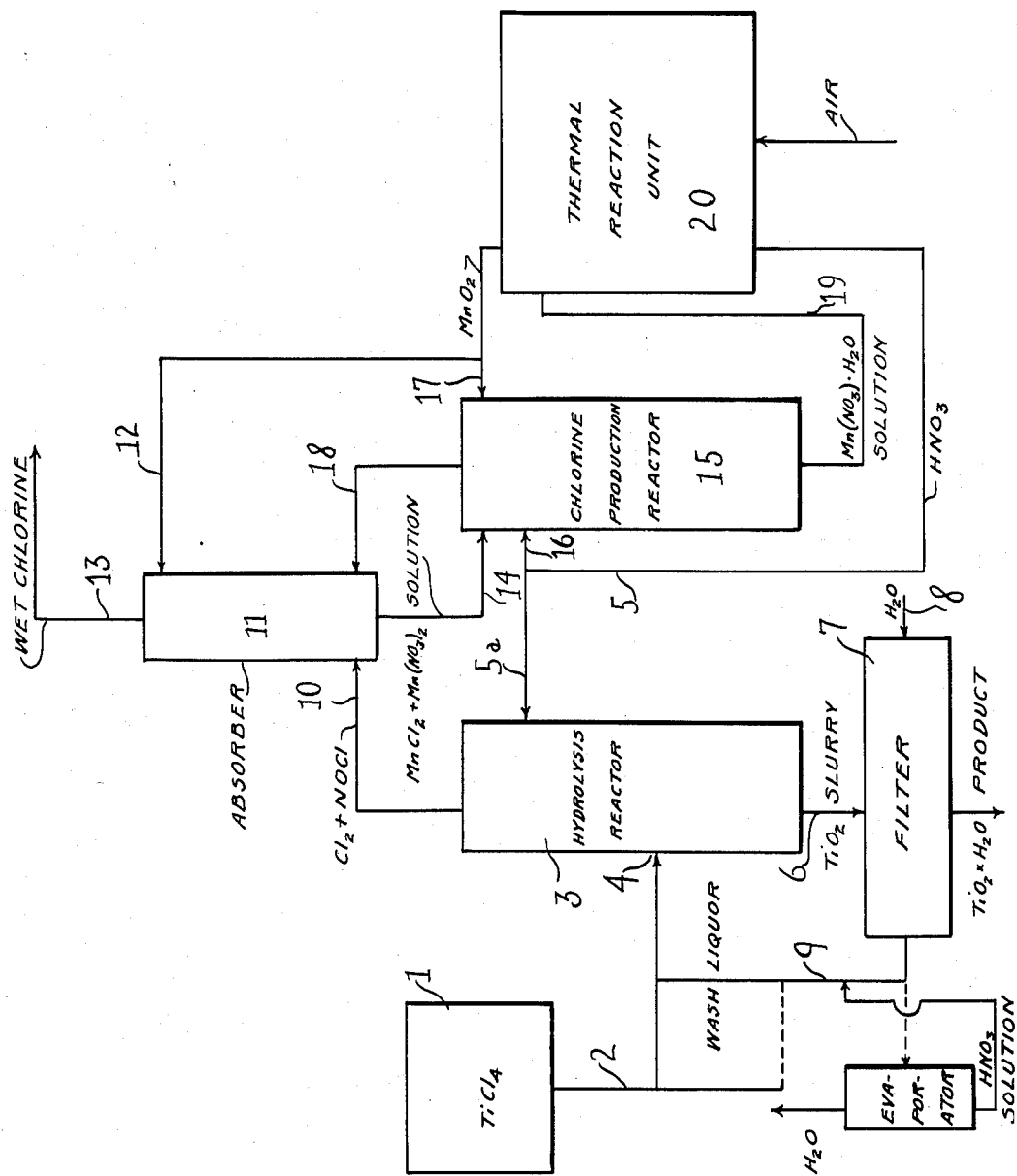

2,732,310

PRODUCTION OF TITANIUM DIOXIDE

Ralph Miller, Pleasantville, N. Y., assignor to The Chemical Foundation, Incorporated, a New York membership corporation Application May 6, 1952, Serial No. 286,384

5 Claims. (Cl. 106—300)

This invention is primarily concerned with the production of titanium dioxide and more particularly with the production of titanium dioxide from its ores by way of titanium tetrachloride.

A second aspect of this invention is the processing of the chlorides other than titanium formed along with the production of titanium tetrachloride.

The most important titanium containing commercial product is pigment grade titanium dioxide. While the production of titanium metal is of growing importance, it is at present but a minor industry compared with the titanium pigment industry.

The major quantity of titanium dioxide pigments is produced from ilmenite using the classical sulfuric acid process or minor variations of the sulfuric acid process. The sulfuric acid process for the production of titanium dioxide pigments possesses many deficiencies which are well known to those familiar with the industry. As a result of these widely recognized deficiencies strenuous efforts have been made to devise and develop processes which avoid the use of sulfuric acid. Chloride and fluoride processes have been developed through the pilot plant stage but in each case the cost of operating processes based on either of these ions appeared to be substantially higher than the sulfuric acid process. Nitrate solutions of titanium have been described but these have been formed by means which are designated as indirect and for that reason are regarded as of only academic interest.

In the sulfuric acid process for the production of titanium dioxide pigments, the dioxide is precipitated or formed by the hydrolysis of a titanium sulfate solution. The titanium sulfate solution normally contains an appreciable quantity of dissolved iron so that the final hydrolysis solution is composed of a dilute sulfuric acid solution in which some ferrous sulfate is dissolved. Most titanium salts, with the exception of the fluoride, hydrolyze on boiling or dilution to form hydrated titanium dioxide and the corresponding acid. It is known that titanium dioxide precipitated from a sulfate solution by hydrolysis precipitates in the anatase form. Titanium dioxide precipitated from chloride or nitrate solutions can be precipitated in the rutile form with little difficulty. Since the rutile form of titanium dioxide makes for a superior pigment because of its higher index of diffraction, there has been an additional incentive to displace the sulfuric acid process with a chloride process.

Titanium tetrachloride is readily made from titanium ores by chlorinating the ores after admixture with carbon or carbonaceous substances and baking. When this is done, most of the iron contained in the ore is also chlorinated so that a mixture of titanium chloride and iron chloride is formed. Ferric chloride, however, is practically insoluble in liquid titanium tetrachloride so that the separation of the two chlorides from each other is a simple matter. The production of ferric chloride increases the consumption of chlorine. This chlorine can be saved in part at the expense of forming titanium carbide from the ore prior to chlorination. Although titanium tetrachloride is readily made from titanium-containing ores, and the tetrachloride can be economically and simply purified by fractional distillation in the presence of readily available purifying agents such as copper powder or oleic acid, and despite the advantage of being able to easily produce a rutile type pigment from a chloride solution, it has not been possible for the chloride process to displace the sulfuric acid process to any appreciable extent. The reason for this condition lies in the fact that the usual conversion of the tetrachloride to the oxide by hydrolysis results in the formation of a relatively dilute hydrochloric acid solution as the hydrolysis liquor. Such a solution is expensive to handle and has little value as such. Moreover, it cannot be used as such to treat most titanium ores to form additional quantities of titanium tetrachloride and no economical method has been available for converting it to chlorine.

In order to avoid these limitations it has been proposed to split titanium tetrachloride at greatly elevated temperatures with air or oxygen to form titanium dioxide and chlorine. Titanium dioxide produced in this fashion is reported to possess satisfactory pigment properties. However, if air is used to supply the oxygen, the chlorine is formed admixed with an excessive quantity of nitrogen which makes its subsequent utilization difficult and expensive. If pure oxygen is used then the chlorine is produced in a relatively concentrated condition which simplifies its subsequent utilization, but the process must then bear the expense of a very high temperature process and the cost of producing oxygen in high concentration. Even with the advances recently made in the production of oxygen on a large scale, the sulfuric acid process remains more economical.

An important aspect of any titanium dioxide pigment process is that it be capable of producing composite pigments as well as pure titanium dioxide pigments. Composite pigments are made by hydrolytically precipitating pigment grade $TiO_2$ on an extender such as barium sulfate or calcium sulfate. Composite pigments make up an important portion of the titanium dioxide industry. Obviously, the production of composite pigments by the high temperature thermal splitting process with oxygen is impossible. This is another reason for its failure to be developed commercially.

In the conversion of any titanium salt to titanium dioxide of pigment grade, it frequently is advantageous to be able to form the dioxide in the presence of nuclei formed under carefully controlled conditions which nuclei tend to control the form of the main titanium dioxide precipitate. No thermal splitting process permits the use of such a method of controlling the properties of the product.

It is an object of this invention to form pure titanium dioxide from titanium ores by way of titanium tetrachloride.

A second object of this invention is to convert titanium tetrachloride to titanium dioxide and chlorine at relatively moderate temperatures.

A third object of this invention is to convert titanium tetrachloride to the rutile form of $TiO_2$ and chlorine in such a manner that the $TiO_2$ can be formed on an extender to form a composite pigment.

An additional object of this invention is to convert titanium tetrachloride into titanium dioxide and chlorine and to produce the chlorine substantially free from fixed gases.

A further object of this invention is to convert titanium tetrachloride into chlorine and titanium dioxide and to produce the titanium dioxide in the rutile form.

Yet another object of this invention is to convert titanium tetrachloride into titanium dioxide and chlorine without the consumption of any chemical reagents, excluding mechanical losses.

An additional object of this invention is the conversion of titanium tetrachloride into titanium dioxide of pigment quality under conditions which permit the conversion to take place in the presence of preformed nuclei.

A major objective of this invention is to device a process for converting titanium tetrachloride into titanium dioxide and chlorine in the presence of impurities without unduly impairing the quality of the product or materially raising the cost.

Other objectives and advantages of the process will be clear from the description below.

In order to more readily explain the invention there is shown in the accompanying drawings a flow sheet depicting the main steps of the process.

One method of carrying out this invention is to form titanium tetrachloride from chlorine, a titanium containing ore and a carbonaceous material. The titanium tetrachloride after being substantially freed from impurities is passed from receiver 1 through line 2 to reactor 3.

The hydrolysis reactor 3 can, in one form of the invention, take the form of a reaction tower. The titanium tetrachloride can be added to the tower either as the vapor or the liquid or in the form of a concentrated aqueous solution. Local conditions usually will determine which method is preferable. The initial description of the invention is conveniently described in terms of the addition of the liquid tetrachloride. The liquid tetrachloride is pumped into the reaction tower through an inlet nozzle 4 at about the center of the tower. Close to the top of the tower relatively concentrated nitric acid, e. g., the constant boiling mixture, is pumped into the tower through line 5 and branch line 5–a. The upper half of the tower preferably is fitted with contacting aids such as raschig rings. The acid flows down the tower through the packing intimately contacting the ascending gases. Below the packing the nitric acid joins the reacting mixture into which the titanium tetrachloride is flowing. The nitric acid reacts with the titanium tetrachloride. The reactions taking place in the tower may be summarized in the over-all reaction:

(1) $3TiCl_4 + 4H_2O + 4HNO_3 = 3Ti(OH)_4 + 4Cl_2 + 4NOCl$ 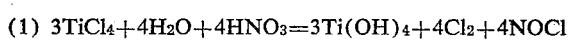

Reaction (1) takes place by maintaining the liquid reacting mixture at about the boiling point. The temperature within the tower is controlled in part by controlling the temperature of the reactants as they enter the tower. The tower should be equipped with steam coils in the base or, preferably, the tower should have an auxiliary circulating system so that the mixture formed in the base of the tower may be pumped through a heat exchanger to raise its temperature and then returned to the tower.

Part of the circulating stream may conveniently be diverted to a second reactor in which any dissolved titanium will have additional opportunity to come out of solution as hydrated $TiO_2$. The second reactor is not essential if the primary reactor is sufficiently large to afford the reacting mixture a residence time of about two hours. The resulting aqueous slurry is discharged through line 6 and filtered in filter 7. The solid dioxide is washed with water entering from line 8 to recover any acid values it contains. The washed solid is discharged from the filter and then calcined to develop its pigment properties. Wash liquor may be charged to the reactor by way of line 9. The chlorine and nitrosyl chloride formed in the reactor pass overhead through line 10 to the absorber 11 wherein it is treated in a manner to be described.

Some of the unusual aspects of this particular method of carrying out the invention may now be pointed out. Titanium tetrachloride is converted to titanium dioxide in the aqueous phase by reaction with an acid. Without the addition of a base both the latent acidity of the tetrachloride and the acidity of the added acid are diminished, thus permitting the formation of the dioxide to continue. Because the tetrachloride is converted to the oxide in an acid environment, the solid dioxide precipitates in the rutile form. In addition to these two advantages, the reaction converts two-thirds of the chloride into chlorine.

In the event it is desired to produce a composite pigment on an extender such as barium sulfate or calcium sulfate, a slurry of the extender is prepared which is pumped into the reactor at a location below the point at which the packing ends. In this way the $TiO_2$ may be precipitated in such a way that it forms on the surface of the extender. The operation may be carried out either batchwise or continuously. The latter method is preferable when the operation is carried out on a very large scale although, by using the auxiliary circulating system mentioned above a continuous operation is possible even with relatively small through-puts.

It has been pointed out that it frequently is desirable to control the properties of the precipitate by forming it in the presence of nuclei prepared under special conditions. The process of this invention permits this type of control since it is only necessary to have the nuclei in the tower as the titanium dioxide is being formed.

The other principal gaseous product of the reaction is nitrosyl chloride. To recover the values represented by the nitrosyl chloride, the mixed gases formed during the reaction are contacted by the downcoming nitric acid. This effectively removes most of the hydrogen chloride that might tend to accompany the other gases although this is not essential. In addition some of the nitrosyl chloride tends to react with the nitric acid to form chlorine and nitrogen dioxide. This, too, is not essential. A small amount of nitric acid may also be vaporized but this acid is automatically recovered in the subsequent steps of the process.

The gases leaving the hydroylsis reactor are drawn through the absorber 11 in which they are contacted with a slurry of manganese dioxide entering from line 12. The chlorine is unaffected by the manganese dioxide and flows out of the top of the absorber through line 13 free from substantially all other gases except some water vapor. The nitrosyl chloride reacts with the manganese dioxide in the absorber to form an aqueous solution of manganous nitrate and manganous chloride:

(2) $2NOCl + 2MnO_2 = Mn(NO_3)_2 + MnCl_2$ 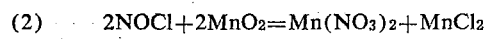

Since both manganous chloride and manganous nitrate are very soluble salts, concentrated solutions of both are formed without difficulty. In this way the nitrosyl chloride is separated from the chlorine and fixed in the form of manganous salts.

The mixed manganous salt solution flows through line 14 into a second tower reactor 15. A supply of nitric acid is fed to the reactor through line 16 and solid manganese dioxide is also added to this tower reactor through conduit 17. Since manganese dioxide is used in the second tower reactor, it is not essential that the solution formed in the absorber be free from manganese dioxide before it enters the second tower reactor. It is preferable to have the nitric acid fairly concentrated, for example, 50% $HNO_3$, and in the neighborhood of its boiling point. It is also helpful to have an excess of solid manganese dioxide present. In the second reaction tower the manganous chloride reacts with the nitric acid and manganese dioxide to form chlorine and manganous nitrate:

(3) $MnO_2 + 4HNO_3 + MnCl_2 = Cl_2 + 2Mn(NO_3)_2 + 2H_2O$ 

The chlorine formed in the second reaction tower leaves the tower at the top through line 18 and it, too, flows into the absorber 11. The chlorine flows into the absorber near the bottom so that it, too, is contacted by the slurry of $MnO_2$. The $MnO_2$ frees it from any oxides of nitrogen or other gaseous impurities such as nitrosyl chloride or hydrogen chloride that tend to accompany it. The chlorine formed in both reactors is joined in the absorber and leaves the absorber at the top. The resulting chlorine is then usually dehydrated and reused to form additional titanium tetrachloride.

An alternative method of operation consists in forming the solution of manganous nitrate and manganous chloride in the absorber in the manner described. The resulting solution then flows into the second reactor in which it is contacted with the fairly concentrated, hot nitric acid without the addition of any appreciable amount of manganese dioxide. The reaction taking place in the second reactor under these conditions may be summarized as:

(4) $3MnCl_2 + 8HNO_3 = 2Cl_2 + 2NOCl + 3Mn(NO_3)_2 + 4H_2O$

The gaseous products of the reaction flow into the absorber close to its base. In the absorber the NOCl reacts with the $MnO_2$ to form additional quantities of manganous nitrate and manganous chloride. The chlorine leaves the tower from the top outlet. The advantage of this method of procedure is that it permits the contacting of the gases with the solid manganese dioxide to be restricted to but one tower and thereby gives the process enhanced flexibility.

It is also possible to add hot nitric acid directly to the absorber, keep the contents of the absorber at the boiling point, insure that the evolved gases are contacted with a slurry of manganese dioxide and carry out the functions of the absorber and second reactor in one tower.

The results of the process to this point are the consumption of nitric acid, manganese dioxide, and titanium tetrachloride and the formation of rutile-type titanium dioxide, chlorine, and a solution of manganous nitrate. The next important step in the process is the conversion of the manganous nitrate to manganese dioxide and nitric acid.

Prior to carrying out this conversion it is desirable to adjust the concentration of the manganous nitrate. Ordinarily, it is convenient to have the manganous nitrate form a solution that is represented by $$Mn(NO_3)_2 \cdot 5H_2O$$

It is possible to apply sufficient heat in the reaction towers so that the effluent solution has this approximate concentration. It is not essential that the solution leave the reaction tower at this high concentration, for it is a simple matter to charge the effluent solution to a conventional evaporator in which sufficient water is vaporized to reach the concentration specified above. If certain types of impurities such as iron are present in the solution entering the evaporator, they may come out of solution during the concentration step. For this reason it may be advisable to filter the concentrated manganous nitrate solution prior to the conversion step. The manganous nitrate solution is withdrawn through the base of reactor 15 and passed through line 19 to thermal reduction unit 20.

The conversion is carried out by the thermal reaction of hydrated manganous nitrate and air:

(5) $Mn(NO_3)_2 \cdot H_2O + \frac{1}{2}O_2(air) = MnO_2 + 2HNO_3$

This reaction is fundamentally different from the thermal decomposition of manganous nitrate. The simple thermal decomposition of manganous nitrate results in the formation of $MnO_2$ and $NO_2$:

(6) $Mn(NO_3)_2 = MnO_2 + 2NO_2$

The conversion of $NO_2$ to nitric acid is a costly procedure and its avoidance makes for marked economy.

In order that reaction (5) takes place rather than reaction (6) certain attainable but specific conditions must be maintained. The thermal reaction takes place at an appreciable rate at about 180–200° C. At significantly lower temperatures the reaction rate is quite slow because the reaction occurs simultaneously with the evaporation of appreciable amounts of water. The temperature at which the reaction occurs may not be excessively high nor may the nitric acid formed be permitted to remain in the elevated temperature zone for more than a brief period; otherwise the nitric acid will decompose. It is also essential that the reaction take place in a thin film in the presence of an excess of air. The presence of a relatively large quantity of steam is also needed so that the tendency for oxides of nitrogen to form is diminished. If these necessary conditions or their equivalent are not met, then oxides of nitrogen are formed rather than nitric acid.

There are at least two methods which permit the thermal reaction to take place as written. The preferred method is to use a dense phase fluidized bed, made up of manganese dioxide. The bed is kept at the required temperature, preferably about 200° C., by the continuous addition of solid manganese dioxide heated to some convenient higher temperature such as 300° C. The manganese dioxide is heated to the higher temperature by withdrawing some of the $MnO_2$ in the thermal reaction bed and adding it to a fluidized bed heated by contact with hot products of combustion.

The thermal reaction is carried out by spraying a relatively concentrated solution of manganous nitrate into the fluidized bed. In addition, air, preferably preheated, is also passed up through the bed. The air plus the water vaporized from the solution and the gaseous nitric acid formed by the reaction all aid in keeping the bed in the fluidized state. The reaction takes place on the very extended surface provided by the moving particles of $MnO_2$ which constitutes the bed. The water contained in the concentrated solution of manganous nitrate provides the necessary steam atmosphere. The air aids in fluidization, adds heat, and its oxygen content enters into the reaction so that nitric acid is formed rather than oxides of nitrogen.

The gases leaving the thermal reaction are made up of water vapor, nitric acid and excess air. This gaseous stream is preferably led into a fractionating column equipped with a reflux condenser. The gaseous effluent from the column is made up of fixed gases and water vapor. The liquid product is nitric acid containing from 50 to 67% $HNO_3$. Both the nitric acid and the manganese dioxide formed in the thermal reaction bed are recovered and recycled.

Another method of carrying out the thermal reaction is to enclose an internally heated rotating drum in a housing resistant to nitric acid. A film of the concentrated manganous nitrate solution is applied to the rotating drum at such a rate that the manganous nitrate contained in the film is decomposed in less time than it takes for the drum to make one complete revolution. The housing is connected to a fractionating column and a slight vacuum pulled on the entire system. This causes air to be drawn over the drum while the decomposition is taking place. A knife blade is fixed in such a position that it scrapes off the solid $MnO_2$ formed on the drum before the succeeding film is applied to the drum. The vapor leaving the drum is drawn through the fractionating column and relatively concentrated nitric acid is recovered from the base of the column.

It is almost inevitable in producing titanium tetrachloride from titanium-containing ores that other metallic chlorides also be formed. Typical chlorides are silicon tetrachloride and iron chloride. Although the titanium tetrachloride can be made almost completely free from other chlorides prior to its conversion to titanium dioxide, the formation of these other chlorides obviously increases the consumption of chlorine. It is desirable to be able to recover the chlorine so consumed if it can be done economically. Another advantage of this invention is that it permits chlorine to be recovered from the principal metallic chlorides formed simultaneously with the titanium tetrachloride. One method of treating these chlorides to recover chlorine therefrom is to use an auxiliary chlorine formation reaction tower. These chlorides are reacted in the tower with nitric acid and manganese dioxide. In the case of silicon tetrachloride the corresponding oxide is formed in the tower; in the case of iron chloride, if the manganous nitrate solution reaches a temperature of about 135° C. prior to its leaving the tower, ferric oxide will form in the tower. The oxides are separated from the manganous nitrate solution by filtration prior to the conversion of the manganous nitrate to manganese dioxide and nitric acid.

The foregoing method of carrying out the invention is especially useful when the titanium tetrachloride is carefully purified prior to its conversion to $TiO_2$. If it is necessary to process $TiCl_4$ which contains impurities which may have a deleterious effect on the pigment properties of the product, it may be desirable to vary the process in the following manner. The titanium tetrachloride is dissolved in a hydrochloric acid solution to form an aqueous titanium oxychloride solution. The dissolution of titanium tetrachloride in an aqueous solution is an exothermic reaction and the heat evolved causes a very appreciable percentage of the chloride to be evolved as hydrogen chloride. The resulting titanium oxychloride solution is then hydrolyzed in a hydrochloric acid solution to precipitate hydrated titanium dioxide in the rutile form. Since the hydrolysis reaction forms additional quantities of hydrogen chloride, the hydrolysis reaction can be conducted in such a way as to cause additional quantities of hydrogen chloride to vaporize.

The fundamental reason for carrying out the process in this manner is that it permits the titanium tetrachloride to be converted to solid hydrated titanium dioxide without simultaneously converting the deleterious impurities contained in the titanium tetrachloride to solid contaminants which have an adverse effect on the product. The impurities, small in quantity, remain in the hydrolysis liquor. The hydrolysis liquor is permitted to accumulate these impurities short of the point where the impurities have an undesirable effect on the product. Various methods can be used to avoid reaching an undesirable accumulation of impurities. Some of these methods will be mentioned below.

It is advantageous to describe the process in terms of forming a hydrolysis solution containing constant boiling HCl. This concentration is approximately 20% HCl. The crude titanium tetrachloride is dissolved in a limited amount of constant boiling HCl. The dissolution is exothermic causing hydrogen chloride to vaporize. Usually so much hydrogen chloride leaves the solution that the chloride to titanium ratio is markedly lower than 4 to 1. The resulting concentrated titanium oxychloride solution is then added to an additional quantity of constant boiling acid and the solution boiled. This operation is preferably carried out continuously. Since the initial hydrolysis liquor is constant boiling acid and the titanium oxychloride is added as a relatively concentrated solution containing from 200–400 g./l. of dissolved $TiO_2$ (expressed as the hydrolysis product), and since the solution tends to become more acid due to the consumption of water and formation of hydrogen chloride, then the excess hydrogen chloride leaves the hydrolysis reactor as a relatively concentrated gas. By maintaining the solution at the boiling point and employing a hydrolysis reactor fitted with a fractionating column, the resulting hydrolysis liquor will consist of constant boiling acid in which a small amount of titanium is dissolved.

The slurry formed in the hydrolysis reactor may then be moved to a settler in which the solid constituents are allowed to separate from the main body of the hydrolysis liquor. The settled slurry is separated from the relatively clear hydrolysis liquor in any of the usual ways. Part of the hydrolysis liquor is returned to the hydrolysis reactor and part is used to dissolve an additional quantity of titanium tetrachloride to form an additional quantity of a concentrated titanium oxychloride solution. The remainder is treated to recover its hydrogen chloride content as by distillation. The amount treated by distillation depends upon the impurity content of the initial tetrachloride and the product to be made.

The separated settled slurry is preferably washed in a continuous counter-current system or on a filter or by means of a series of mixers and centrifuges. In order to free the product from impurities and to recover the acid values in the cake, wash water, preferably warm, must be supplied. This wash water ends up in part as a hydrochloric acid solution lower in concentration than the initial hydrolysis liquor and in part admixed with the cake on the filter. The dilute hydrochloric acid is added to the hydrolysis liquor in the hydrolysis reactor. The water supplied as wash water in this way also supplies the water needed for the hydrolysis reaction:

(7)  $TiCl_4 + 4H_2O = 4HCl + Ti(OH)_4$ 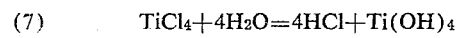

By proceeding in the described manner the $TiCl_4$ is converted to hydrated $TiO_2$ and HCl mixed with a relatively small amount of water. The HCl by fractional condensation can be separated from much of the water that tends to accompany it.

The hydrogen chloride vaporized while dissolving titanium tetrachloride in constant boiling acid and that vaporized in the hydrolysis reactor is continuously converted to chlorine by either a one or two tower chlorine formation reactor system. The system easiest to operate involves passing the HCl into a slurry of manganese dioxide pumped into the tower close to the top. The dissolution of the HCl warms the slurry at the point of solution. The HCl reacts with the $MnO_2$ in the slurry to form gaseous chlorine and a solution of manganous chloride. The gaseous chlorine moves up through the tower contacting the $MnO_2$ slurry which is flowing down the tower. The chlorine leaves the tower through a top outlet. It is then dried and used to produce additional quantities of titanium tetrachloride.

The manganous chloride solution containing some solid $MnO_2$ is then pumped into a second reaction tower. This tower is supplied with additional $MnO_2$ if needed and nitric acid. It is preferable to use preheated, constant boiling $HNO_3$. The manganous chloride reacts with the nitric acid and manganese dioxide to form mostly chlorine, manganous nitrate and water:

(8)  $MnCl_2 + 4HNO_3 + MnO_2 = 2H_2O + 2Mn(NO_3)_2 + Cl_2$ 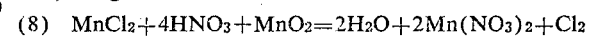

In addition some oxides of nitrogen and nitrosyl chloride form. The values contained in these gases are recovered by having the gases which leave the second reaction vessel at the top flow into the base of the first chlorine reaction tower. In this tower the chlorine is freed from gaseous contaminants. The chlorine formed in both towers leaves the system from the top of the first reaction tower.

The second chlorine reaction tower should be equipped with heating coils or their equivalent so that the resulting manganous nitrate solution has a temperature of about 135° C. before it leaves the reactor. It is also desirable to have an excess of nitric acid in the tower so that the effluent manganous nitrate is substantiallly free from chloride.

It is feasible to employ one long reaction tower in which the functions of the above described towers are combined. If this is done the operation must be conducted with more care since improper operation will result in impure chlorine.

The manganous nitrate solution formed in converting the HCl to chlorine is thermally reacted with steam and air to form nitric acid and manganese dioxide. Both products are recycled to the chlorine production reactions towers. Either of the methods described above can be employed to form nitric acid and manganese dioxide from the manganous nitrate.

The interrelationship of the various steps in the integrated process can now be made clear. It is to be noted that no statement has been made with respect to the yield of hydrated dioxide. The yield approaches 100% although it is not necessary for the hydrolysis to be so carried out that no titanium remains in solution. From the foregoing it is evident that no titanium is lost in the hydrolysis liquor except that small amount contained in the small amount of liquor not recycled to the hydrolysis reactor. Although not mentioned previously, any ferric chloride contained in the concentrated titanium oxychloride solution may be removed by a selective organic solvent such as isopropyl ether or may be reduced to the ferrous state prior to hydrolysis. By carrying out the hydrolysis reaction in the described manner the hydrogen chloride is vaporized in a concentrated condition which materially facilitates its direct conversion to chlorine.

This method of practising the invention permits the titanium dioxide to be precipitated on the usual extenders. The hydrolysis may also be carried out in the presence of preformed nuclei if such a procedure is necessary to secure a product with special properties.

Although the two procedures that have been described differ radically in that in one case the acidity of the solution in which the $TiO_2$ is formed is decreasing and in the other case is either being held constant or increasing slightly, both attain the primary objectives of the invention. The desirability of being able to treat titanium tetrachloride to secure titanium dioxide in the rutile form and chlorine has been recognized for many years but no economically attractive process for its accomplishment was known. Of the many proposed methods for attaining this objective only the thermal splitting methods seemed to be technically feasible.

This invention shows how in the presence of water the titanium in titanium tetrachloride can be converted to pigment grade $TiO_2$ with the simultaneous conversion of the chloride to chlorine.

While preferred modifications of the invention have been described, it is to be understood that these are given didactically to illustrate the underlying principles involved and not as limiting its useful scope to the particular illustrated embodiments.

I claim:

1. The process of producing rutile type, pure titanium dioxide from a titanium containing raw material which comprises contacting said raw material with a carbonaceous reducing agent and chlorine at an elevated temperature to form titanium tetrachloride, recovering said titanium tetrachloride, purifying the titanium tetrachloride so that it is substantially free from deleterious impurities, reacting the purified titanium tetrachloride with nitric acid and water to form rutile type hydrated titanium dioxide and a gaseous mixture of chlorine and nitrosyl chloride, separating the gaseous mixture from the titanium dioxide, contacting the separated gaseous mixture with an aqueous slurry of manganese dioxide to convert the nitrosyl chloride to a solution of manganous nitrate and manganous chloride thereby separating the chlorine from the nitrosyl chloride, recycling the separated chlorine to the titanium tetrachloride formation step of the process, reacting the manganous chloride formed from the manganese dioxide with nitric acid and manganese dioxide to form additional gaseous chlorine and additional manganous nitrate, separating the gaseous chlorine from the manganous nitrate, thermally reacting the separated manganous nitrate with air and water to form manganese dioxide and nitric acid separating the manganese dioxide from the nitric acid and recycling the separated manganese dioxide to the slurry contacting step and the nitric acid to the titanium dioxide formation step.

2. A process in accordance with claim 1 in which the thermal reaction of the manganous nitrate with air and water is carried out by spraying a concentrated solution of manganous nitrate into a dense phase fluidized bed of manganese dioxide maintained at a temperature of about 200° C. through which air is being passed.

3. A process in accordance with claim 1 in which the titanium dioxide formation reaction is carried out in the presence of a slurry of calcium sulfate to form a composite titanium dioxide-calcium sulfate pigment.

4. A process in accordance with claim 1 in which the titanium dioxide formation reaction is carried out in the presence of a slurry of barium sulfate to form a composite titanium dioxide-barium sulfate pigment.

5. A process in accordance with claim 1 in which the titanium dioxide formation reaction is carried out in the presence of a substantially inert pigment extender.

References Cited in the file of this patent

UNITED STATES PATENTS

| Number | Name | Date |
|---|---|---|
| 1,845,342 | Saklatwalla | Feb. 16, 1932 |
| 2,184,885 | Muskat et al. | Dec. 26, 1939 |
| 2,240,343 | Muskat | Apr. 29, 1941 |
| 2,347,496 | Muskat et al. | Apr. 25, 1944 |